United States Patent
Chen et al.

(10) Patent No.: US 9,510,373 B2
(45) Date of Patent: Nov. 29, 2016

(54) METHOD AND APPARATUS FOR ALLOCATING RADIO NETWORK TEMPORARY IDENTIFIER

(71) Applicant: Huawei Technologies Co., Ltd., Shenzhen (CN)

(72) Inventors: Dong Chen, Shanghai (CN); Yuan Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 14/334,315

(22) Filed: Jul. 17, 2014

(65) Prior Publication Data

US 2014/0329532 A1    Nov. 6, 2014

Related U.S. Application Data

(63) Continuation of application No. PCT/CN2013/070403, filed on Jan. 14, 2013.

(30) Foreign Application Priority Data

Jan. 20, 2012    (CN) .......................... 2012 1 0018836

(51) Int. Cl.
*H04W 72/00* (2009.01)
*H04W 76/02* (2009.01)
*H04W 8/26* (2009.01)
*H04W 84/04* (2009.01)

(52) U.S. Cl.
CPC ............. *H04W 76/021* (2013.01); *H04W 8/26* (2013.01); *H04W 84/045* (2013.01)

(58) Field of Classification Search
CPC ............................ H04W 76/021; H04W 8/26
USPC .......................................... 455/450; 370/338
See application file for complete search history.

(56) References Cited

U.S. PATENT DOCUMENTS

2010/0189071 A1    7/2010  Kitazoe
2013/0040642 A1    2/2013  Xu et al.

FOREIGN PATENT DOCUMENTS

| CN | 101080094 A | 11/2007 |
|---|---|---|
| CN | 101572876 A | 11/2009 |
| CN | 101600197 A | 12/2009 |
| CN | 102075920 A | 5/2011 |
| CN | 102223621 A | 10/2011 |
| CN | 102256315 A | 11/2011 |

OTHER PUBLICATIONS

Nokia Siemens Networks, "U-RNTI Management by the HNB-GW," 3GPP TSG-RAN WG3 Meeting #74, R3-112870, Nov. 14-18, 2011, 6 pages.

(Continued)

*Primary Examiner* — Marcos Batista
(74) *Attorney, Agent, or Firm* — Slater Matsil, LLP (57) ABSTRACT

A method and a device for allocating a radio network temporary identifier are provided. According to the utilization of radio network temporary identifier resources, a gateway sends an update message for radio network temporary identifier resources to a micro cell, or a micro cell notifies a gateway of updating an allocation situation of radio network temporary identifier resources of the micro cell so as to avoid waste or insufficiency of resources.

6 Claims, 3 Drawing Sheets

(56) References Cited

OTHER PUBLICATIONS

Alcatel-Lucent, "Enhanced HNB Mobility in CELL_FACH," 3GPP TSG-RAN3 Meeting #74, R3-113088, Nov. 14-18, 2011, 13 pages.

3rd Generation Partnership Project; Technical Specification Group Radio Access Network; UTRAN architecture for 3G Home Node B (HNB); Stage 2 (Release 10), 3GPP TS 25.467, V10.4.0, Dec. 2011, 61 pages.

3rd Generation Partnership Project; Technical Specification Group Radio Access Network; UTRAN Iuh interface Home Node B (HNB) Application Part (HNBAP) signalling (Release 10), 3GPP TS 25.469, V10.1.0, Jun. 2011, 77 pages.

METHOD AND APPARATUS FOR ALLOCATING RADIO NETWORK TEMPORARY IDENTIFIER

This application is a continuation of International Application No. PCT/CN2013/070403 filed on Jan. 14, 2013, which claims priority to Chinese Patent Application No. 201210018836.5, filed on Jan. 20, 2012, both of which are hereby incorporated by reference in their entireties.

TECHNICAL FIELD

The present disclosure relates to the field of micro cells, and in particular to a method and an apparatus for allocating a radio network temporary identifier (UTRAN Radio Network Temporary Identifier, referred to as U-RNTI for short in the following; a universal terrestrial radio access network is referred to as UTRAN for short in the following).

BACKGROUND

A home base station (Home NodeB, referred to as HNB for short in the following) is a femtocell, oriented to a residence environment or an enterprise environment. In the scenario of an enterprise network or a hot spot, an HNB group may be used to provide continuous coverage for the enterprise network or the hot spot. The HNB is connected to a core network (referred to as CN for short in the following) through a home base station gateway (Home NodeB Gateway, referred to as HNB-GW for short in the following). One HNB-GW is connected to a plurality of HNBs, and coverage of the HNBs may be geographically continuous.

On an HNB network, a coverage range of each HNB is less than that of a macro network cell. One HNB covers a range of about ten meters. When a UE moves on the HNB network, the UE has to handover itself to or reselect another HNB cell frequently, where the handover or reselection is more frequent than that on a macro network.

A status of a cell forward access channel (Cell Fach forward access channel, referred to as CELL_FACH for short in the following) is taken as an example. When a user equipment (referred to as UE for short in the following) moves to a new radio network controller (referred to as RNC for short in the following), the UE starts a cell reselection process. The UE sends a cell update (CELL UPDATE) message to a target cell to trigger a cell update process. The target cell determines a source cell where the UE is located by identifying a U-RNTI in the CELL UPDATE message. Therefore, it must be ensured that the U-RNTI of the UE uniquely identifies a UE on the whole UTRAN. The U-RNTI is comprised of an RNC identity (referred to as RNC-ID for short in the following) and a serving RNC radio network controller radio network temporary identifier.

However, on a home base station network, a U-RNTI management mechanism of the macro network cannot ensure that the U-RNTI is unique. According to the structure of the HNB network, an HNB-GW and all HNBs connected to the HNB-GW are one RNC as a whole from the perspective of the core network CN, and the HNBs under the same HNB-GW share the same RNC-ID. When the registration of an HNB, the HNB-GW sends an RNC-ID to the HNB. When the HNB allocates a U-RNTI to the UE, it can only be ensured that an S-RNTI is unique in the range of the current HNB, but it cannot be ensured whether another HNB under the same HNB-GW uses the S-RNTI. Therefore, it cannot be ensured that the U-RNTI is unique in the HNB-GW; that is, the HNB cannot ensure that the U-RNTI is not used by another HNB under the same HNB-GW.

On the HNB network, when a source HNB allocates a U-RNTI, it can only be ensured that the U-RNTI is unique in the HNB and it cannot be ensured that the U-RNTI is unique in the whole RNC and UTRAN. Furthermore, a target HNB cannot know a U-RNTI allocation situation of other HNBs under the same HNB-GW. Therefore, the target HNB cannot identify the source HNB according to the U-RNTI so that it cannot accurately transfer a cell update message to the source HNB.

If the cell update message is incorrectly transferred to an HNB cell, the cell update process is disordered. For example, a user equipment A moves from a home base station A to a home base station B and resides in home base station B through cell reselection. The user equipment sends a cell update message including a current U-RNTI (allocated by HNB A) of user equipment A to home base station B. If the U-RNTI currently used by user equipment A is allocated by another home base station C to user equipment B, home base station B analyzes the U-RNTI to decide that a source HNB that user equipment A moves from is home base station C, and home base station B forwards the cell update message to home base station C. Home base station C receiving the cell update message, as a source cell, initiates a reposition process for user equipment B. As a result, user equipment B is released by HNB C and is in a state that the network cannot page user equipment B, and use equipment A cannot reside in a cell of the home base station B.

In the prior art, the HNB-GW allocates non-overlapping U-RNTI prefix segment/index or identifier segment to each HNB. When an HNB is connected to the HNB-GW, the HNB-GW designates U-RNTI prefix segment/index or identifier segment that can be allocated to the HNB.

The HNB may report its capability information (the information indicates the number of required U-RNTIs) to the HNB-GW during registration, and the HNB-GW allocates U-RNTI resources according to the capability of the HNB so as to avoid improper use of U-RNTIs among cells resulted from that the same number of U-RNTIs are allocated for HNBs different in load. If an HNB supports at most 16 users, an index value allocated to the HNB is 16 bits (HNB-GW RNC-ID is 12 bits, and the index value of the HNB is 16 bits, and therefore 4 bits can be used to flexibly allocate U-RNTIs).

However, in the prior at, the U-RNTI prefix segments, indexes, or identifier segments allocated by the HNB-GW to the HNB are fixed. This may cause a waste of U-RNTIs and reduce the number of UEs that can be supported on an HNB system.

SUMMARY

In order to solve the foregoing problems, the present disclosure provides a method and an apparatus for allocating a radio network temporary identifier so as to avoid a waste or insufficiency of resources.

According to a first aspect, an embodiment of the present disclosure provides a method for allocating a radio network temporary identifier. The method includes the following steps: determining, by a gateway and according to the utilization of radio network temporary identifier resources, to update radio network temporary identifier resources of a micro cell; and sending, by the gateway, an update request for the radio network temporary identifier resources to the micro cell.

According to a second aspect, an embodiment of the present disclosure provides a method for allocating a radio network temporary identifier. The method includes the following steps: receiving, by a micro cell, an update request for radio network temporary identifier resources from a gateway; and updating the radio network temporary identifier resources of the micro cell according to the update request for the radio network temporary identifier resources.

According to a third aspect, an embodiment of the present disclosure provides a method for allocating a radio network temporary identifier. The method includes the following steps: determining, by a micro cell and according to the utilization of radio network temporary identifier resources of the micro cell, to update radio network temporary identifier resources of the micro cell; and sending, by the micro cell, an update request for the radio network temporary identifier resources to a gateway.

According to a fourth aspect, an embodiment of the present disclosure provides a gateway. The gateway includes: a determining unit, for determining, according to the utilization of radio network temporary identifier resources, to update radio network temporary identifier resources of a micro cell; and a notifying unit, configured to send an update request for updating the radio network temporary identifier resources to the micro cell.

According to a fifth aspect, an embodiment of the present disclosure provides a micro cell. The micro cell includes: a receiving unit, for receiving an update request for radio network temporary identifier resources from a gateway; and an updating unit, for updating the radio network temporary identifier resources of the micro cell according to the update request for the radio network temporary identifier resources.

According to a sixth aspect, an embodiment of the present disclosure provides a micro cell. The micro cell includes: a determining unit, for determining, according to the utilization of radio network temporary identifier resources of the micro cell, to update radio network temporary identifier resources of the micro cell; and a notifying unit, for sending an update request for updating the radio network temporary identifier resources to the gateway.

The embodiments of the present disclosure solve the problem that U-RNTI resources in a certain HNB are wasted or insufficient after an HNB-GW allocates U-RNTI resources to HNBs. The HNB-GW can dynamically reclaim U-RNTI resources from or add U-RNTI resources to a certain HNB according to a network load condition.

DETAILED DESCRIPTION OF ILLUSTRATIVE EMBODIMENTS

Embodiment 1

Embodiment 1 provides a method for allocating a radio network temporary identifier of a micro cell. The method includes the following steps: determining, by a gateway and according to the utilization of radio network temporary identifier resources, to update radio network temporary identifier resources of a certain micro cell; and when it is determined to update the radio network temporary identifier resources of the certain micro cell, notifying, by the gateway, the micro cell of updating the radio network temporary identifier resources of the micro cell, where the micro cell may be an HNB or a similar equipment.

Figure 1:
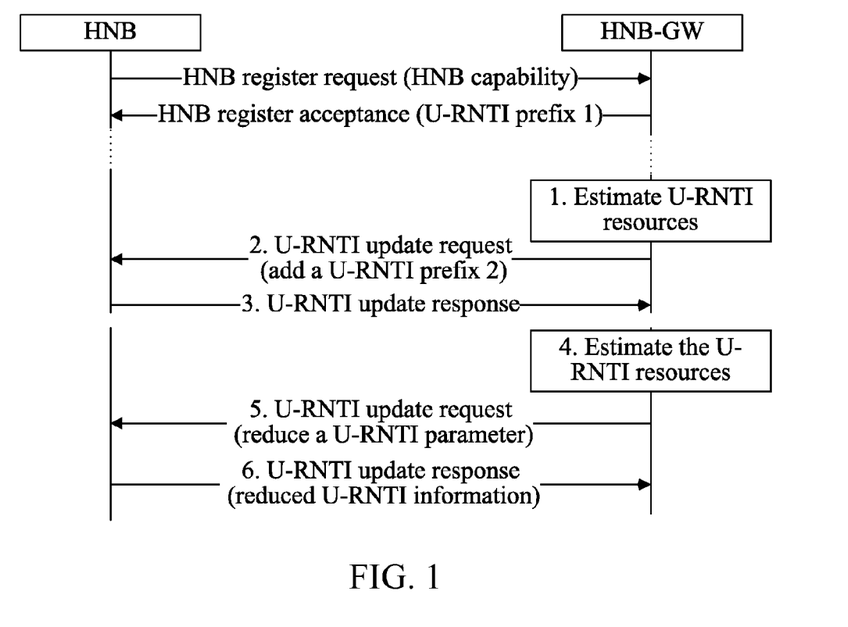
FIG. 1 is a flow chart of allocating a U-RNTI according to a first embodiment of the present disclosure.

FIG. 1 is a flow chart of allocating a U-RNTI according to a first embodiment of the present disclosure.

In an initial configuration state, an HNB carries HNB capability information in an HNB REGISTER REQUEST (register request) message, where the information indicates the number of U-RNTIs required by the HNB.

An HNB-GW allocates usable U-RNTI resources to the HNB according to HNB capability reported by the HNB. The U-RNTI resources may be divided into segments. A segment of U-RNTI resources is represented in a manner of an identifier segment, an index, or a prefix segment, and the U-RNTI resources are allocated or updated by transferring the identifier segment, the index, or the prefix segment. In the following, the situation of allocating U-RNTI resources is described by taking the prefix segment as an example. In this embodiment, a prefix segment prefix 1 of a usable U-RNTI is allocated to the HNB, and the U-RNTI address segment is included in an HNB REGISTER ACCEPT (register accept) message and fed back to the HNB.

Generally, U-RNTI resources under the whole gateway are fixed. During initial configuration, a part of resources are allocated to each HNB according to HNB capability. The gateway may reserve a part of usable resources so as to perform resource update in running.

The resource update may be a resource supplement, and in other words, a part of remaining usable resources that are not allocated in the gateway are allocated to an HNB requiring the resources. The resource update may also be resource reclaiming; that is, surplus resources already allocated to an HNB are reclaimed into the remaining usable resources of the gateway so as to subsequently allocate the reclaimed resources to an HNB with insufficient resources. It should be noted that, estimation of the resource supplement and resource reclaiming may be divided into two separate steps for implementation, and may also be implemented in a single step; that is, it is determined simultaneously whether to supplement or reclaim U-RNTI resources for the HNB. For ease of clear description, in each embodiment of this specification, the resource supplement and resource reclaiming are implemented in two consecutive steps. However, persons skilled in the art will realize that the resource supplement and resource reclaiming may be performed in a reverse order, may further be implemented at the same time, and may further be implemented separately.

In this embodiment, whether to supplement and whether to reclaim U-RNTI resources for the HNB are estimated in step 1 and step 4, respectively. The estimation in step 1 and step 4 may also be implemented in a same step. When an estimation result is supplementing the U-RNTI resources, step 2 and step 3 are performed, and when the estimation result is reclaiming the U-RNTI resources, step 5 and step 6 are performed.

Step 1: The HNB-GW determines, according to the utilization of U-RNTI resources, whether to allocate supplemented U-RNTI resources to the HNB.

The HNB-GW may determine the utilization of the U-RNTI resources according to locally saved user information. The user information may be, for example, an equipment context (context). In an example, for a UE in a CELL_FACH/CELL_DCH/CELL_PCH/URA_PCH excitation state, each user equipment context correspondingly uses one U-RNTI. The HNB-GW records the state of each UE. Therefore, the HNB-GW may determine the number of U-RNTIs used on the network and in each HNB by providing statistics about the number of user equipments in the CELL_FACH/CELL_DCH/CELL_PCH/URA_PCH state on the network.

The HNB-GW may determine, according to the utilization of U-RNTIs, whether U-RNTI resources used by a certain HNB are insufficient; that is, whether unused U-RNTI resources in the HNB is lower than a certain threshold. If the number of unused U-RNTIs in a certain HNB is about to be used up, for example, allocatable U-RNTIs are less than a first threshold or a percentage of the number of unused U-RNTIs in the total number of U-RNTIs is lower than a first threshold, the HNB-GW needs to allocate some U-RNTI prefix segments to the HNB.

In an example, before, during, or after step 1, the HNB-GW may determine whether unallocated U-RNTI resources managed by the HNB-GW are sufficient. For example, the HNB-GW may determine whether the unallocated U-RNTI resources are greater than a threshold. In this case, supplemented U-RNTI resources can be allocated to the HNB.

An opportunity for the HNB-GW to estimate the U-RNTI resources may be controlled by an estimation timer or may be triggered by an event, for example, registration of a new UE or registration of a new HNB.

Step 2: According to an estimation result in step 1, if the HNB-GW needs to further allocate a U-RNTI prefix segment to a certain HNB, the HNB-GW sends a U-RNTI UPDATE REQUEST (update request) to the HNB and sends to the HNB a prefix segment prefix 2 newly allocated to the HNB. The prefix 2 (1001) and the prefix 1 (1000) may be successive, and the prefix 2 (1001) may also be another independent prefix segment. For example, the prefix 1 is the first four bits 1011 of the U-RNTI and the prefix 2 is 1000. Certainly, the prefix segment prefix 2 sent to the micro cell through the update request may also be replaced with radio network temporary identifier resource information in other forms.

The U-RNTI update request may be of a format described in Table 1, but is not limited to the format described in Table 1.

TABLE 1

UPDATE REQUEST FORMAT

| Parameter | Field Attribute | Parameter Type | Description |
|---|---|---|---|
| Update type | Necessary | Enumeration (reclaiming, supplement) | |
| Prefix segment list | Optional | One to the maximum number of prefix segments | |
| --Prefix segment | Necessary | | Indicates a segment of U-RNTI resources and is a sub-field in the prefix segment list |

TABLE 1-continued

UPDATE REQUEST FORMAT

| Parameter | Field Attribute | Parameter Type | Description |
|---|---|---|---|
| Number | Optional | | The number or a percentage of U-RNTIs required to be supplemented or reclaimed |

Step 3: After receiving a new U-RNTI prefix segment, the HNB adds the U-RNTI resources represented by the prefix 2 to the local usable U-RNTIs. Then, the HNB returns a U-RNTI UPDATE RESPONSE (update response) to the HNB-GW to notify the HNB-GW of a success supplement. It should be noted that the U-RNTI update response is optional. After modifying the local U-RNTI resources, the HNB may also not return a response message to the HNB-GW.

The U-RNTI update response may be of a format described in Table 2, but is not limited to the format described in Table 2.

TABLE 2

UPDATE RESPONSE FORMAT

| Parameter | Field Attribute | Parameter Type | Description |
|---|---|---|---|
| Update result | Necessary | Enumeration (success, failure) | |
| Prefix segment list | Optional | One to the maximum number of prefix segments | |
| --Prefix segment | Necessary | | Indicates a segment of U-RNTI resources and is a sub-field in the prefix segment list |

Step 4: The HNB-GW estimates the utilization of the U-RNTI resources and decides whether to reduce U-RNTI resources in a certain HNB.

For example, the HNB-GW determines whether used U-RNTI resources in the HNB are lower than a second threshold. If a utilization ratio of U-RNTI resources in a certain HNB is not high, for example, the number of U-RNTI resources used in the HNB does not reach the second threshold within a certain duration (controlled by a certain timer) or a percentage of the number of used U-RNTIs in the total number of U-RNTIs does not reach the second threshold, the HNB-GW may initiate a U-RNTI reclaiming process for the HNB.

In an example, the HNB-GW may determine whether U-RNTI resources in the range of the HNB-GW are insufficient. If the U-RNTI resources in the range of the HNB-GW are insufficient, for example, U-RNTI resources not allocated to the HNB in the range of the HNB-GW are used up; for example, the U-RNTI resources are lower than a certain threshold, the HNB-GW may initiate reclaiming of U-RNTI resources for an HNB with a not high utilization ratio of U-RNTIs.

The estimation opportunity and the determining, by the HNB-GW, the U-RNTI resource situation are the same as the description in step 3.

Step 5: According to an estimation result in step 4, if the HNB-GW needs to reclaim U-RNTI resources in a certain HNB, the HNB-GW sends a U-RNTI update request to the HNB, where the update request carries a reclaimed U-RNTI parameter, and the reclaimed U-RNTI parameter may be the number of U-RNTIs or may be a percentage of U-RNTIs.

For the U-RNTI update request format, reference may be made to Table 1.

Step 6: The HNB feeds back a reclaimed U-RNTI prefix segment (prefix 3) to the HNB-GW through a U-RNTI update response. For the U-RNTI update response format, reference may be made to Table 2.

An embodiment of the present disclosure may further provide other methods for allocating a radio network temporary identifier of a micro cell. The methods include the following steps: determining, by a micro cell and according to the utilization of radio network temporary identifier resources of the micro cell, whether to update the radio network temporary identifier resources; and when it is determined to update the radio network temporary identifier resources of a certain micro cell, notifying, by the micro cell, a gateway of updating the radio network temporary identifier resources of the micro cell. The other allocation methods are specifically embodied in Embodiments 2 and 3 in the following.

Embodiment 2

Figure 2:
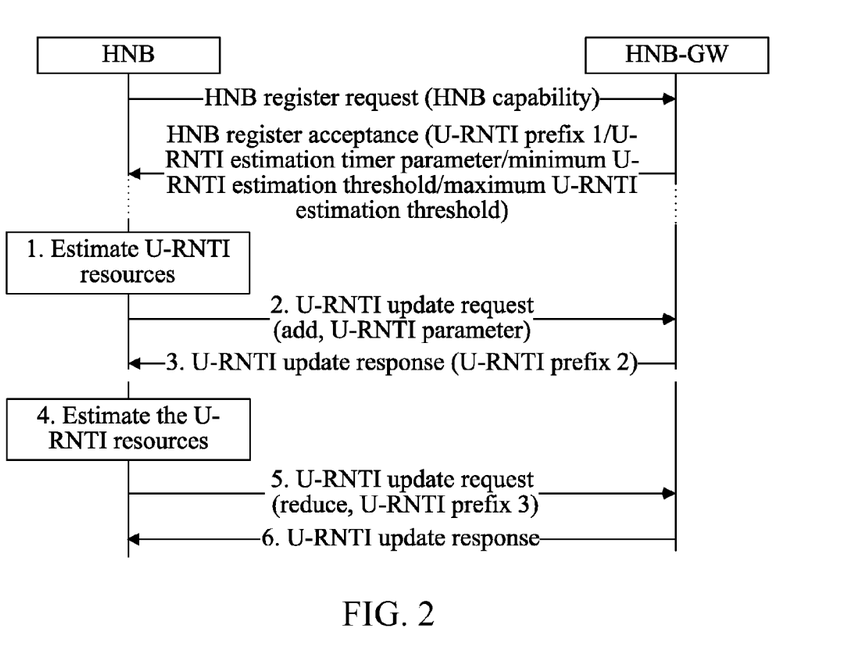
FIG. 2 is a flow chart of allocating a U-RNTI according to a second embodiment of the present disclosure.

FIG. 2 is a flow chart of allocating a U-RNTI according to a second embodiment of the present disclosure.

As shown in FIG. 2, in an initial configuration state, an HNB carries HNB capability information in an HNB register request message. For example, the information indicates the number of U-RNTIs required by the HNB.

An HNB-GW allocates U-RNTI resources to the HNB in an HNB register accept message according to HNB capability reported by the HNB.

The HNB-GW provides the following parameters for the HNB in the register accept message:

a usable U-RNTI prefix segment;

a U-RNTI estimation time parameter, which is a duration of a timer for the HNB to locally estimate the utilization of the U-RNTI resources, where the parameter may include a supplement estimation timer duration and a reclaiming estimation timer duration;

a minimum U-RNTI estimation threshold, which may be the number of U-RNTIs or may be a percentage of used U-RNTIs; and a maximum U-RNTI estimation threshold, which may be the number of U-RNTIs or may be a percentage of used U-RNTIs.

In this embodiment, whether to supplement and whether to reclaim U-RNTI resources for the HNB are estimated in step 1 and step 4, respectively. The estimation in step 1 and step 4 may also be implemented in a same step. When an estimation result is supplementing the U-RNTI resources, step 2 and step 3 are performed, and when the estimation result is reclaiming the U-RNTI resources, step 5 and step 6 are performed. Step 1: The HNB locally estimates the utilization of U-RNTI resources and decides whether to request supplementary allocation of U-RNTI resources, for example, a U-RNTI prefix segment.

For example, if the time that the number or percentage of U-RNTIs used by the HNB exceeds the maximum U-RNTI estimation threshold reaches the supplement estimation timer duration, the HNB should request the HNB-GW to further allocate some U-RNTI resources.

An opportunity for the HNB to estimate the U-RNTI resources may be controlled by an estimation timer or may be triggered by an event, for example, an access request of a new UE.

Step 2: According to an estimation result in step 1, if it is required to request the HNB-GW to supplement U-RNTI allocation, the HNB sends a U-RNTI update request to the HNB-GW to request allocation of a new U-RNTI, where the update request carries a U-RNTI parameter required to be added, and the parameter may be the number of U-RNTIs or may be a percentage of the U-RNTIs.

For description of the U-RNTI update request, reference may be made to Table 1. In addition, the request may also be included in an existing HNBAP (Home NodeB Application Part, adaptation layer protocol) message. For example, information of a U-RNTI required to be supplemented is carried in an update request of a user equipment. The information of the U-RNTI may be a U-RNTI prefix segment.

Step 3: The HNB-GW sends a newly allocated U-RNTI prefix segment to the HNB through a U-RNTI update response.

For description of the U-RNTI update response, reference may be made to Table 2. In addition, the HNB-GW may further include the supplemented U-RNTI prefix segment in the existing HNBAP message. For example, information of a U-RNTI required to be supplemented is carried in a register accept message of a user equipment.

In an example, the HNB-GW may determine whether allocated U-RNTI resources in the range of the gateway are greater than a certain threshold. In the case that the allocated U-RNTI resources are not greater than the threshold, added U-RNTI resource information can be sent to the HNB through the update response.

Step 4: The HNB locally estimates the utilization of U-RNTI resources and decides whether to reclaim a part of U-RNTI resources, for example, a prefix segment.

If the time that the number or percentage of U-RNTIs used by the HNB does not exceed (that is, less than) the minimum U-RNTI estimation threshold reaches the reclaiming estimation timer duration, the HNB-GW should reclaim a part of U-RNTIs.

An opportunity for the HNB to estimate the U-RNTI resources may be controlled by an estimation timer or may be triggered by an event, for example, an access request of a new UE or a release of a connection between a user equipment and an RRC (Radio Resource Control, radio resource control).

Step 5: According to an estimation result in step 4, the HNB feeds back reclaimable U-RNTI resource information to the HNB-GW through a U-RNTI update request.

For description of the U-RNTI update request, reference may be made to Table 1. In addition, the request may also be included in the existing HNBAP message. For example, information of a U-RNTI required to be reclaimed is carried in a register request of a user equipment or a DE-REGISTER (de-register) message of a user equipment.

Step 6: The HNB-GW feeds back a reclaiming result to the HNB through an update response. For description of the U-RNTI update response, reference may be made to Table 2. The HNB-GW may further include the reclaimed U-RNTI prefix segment in the existing HNBAP message. For example, information of a U-RNTI required to be reclaimed is carried in a register accept message of a user equipment.

It should be noted that, the U-RNTI update response is optional, and after modifying local U-RNTI resource allocation, the HNB-GW may not send a response message to the HNB.

Embodiment 3

Figure 3:
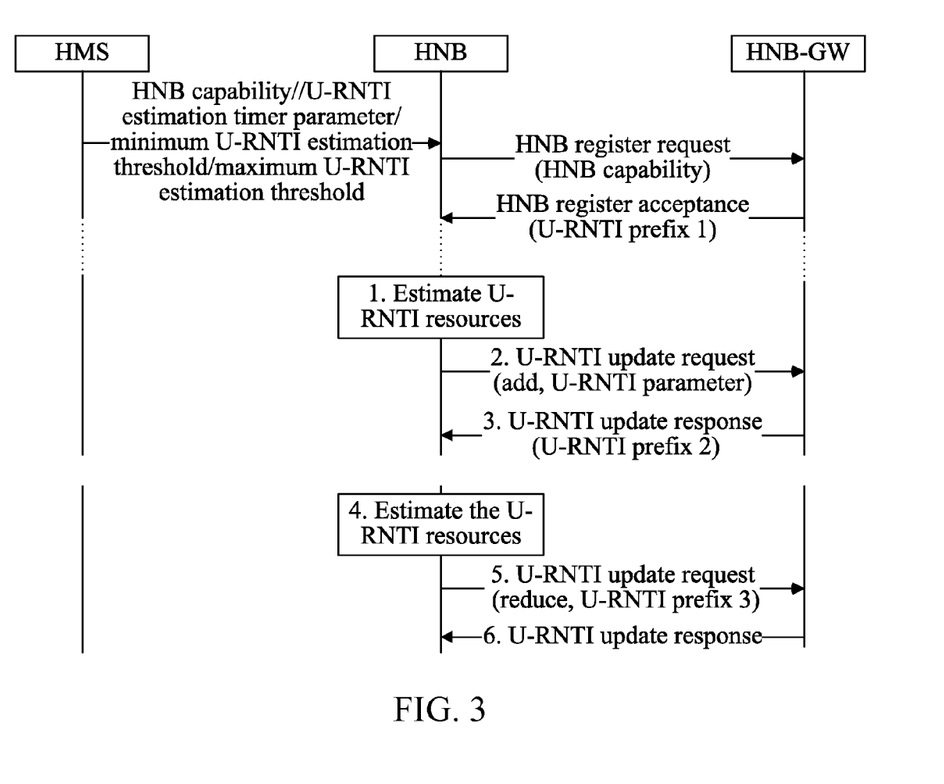
FIG. 3 is a flow chart of allocating a U-RNTI according to a third embodiment of the present disclosure.

FIG. 3 is a flow chart of allocating a U-RNTI according to a third embodiment of the present disclosure.

As shown in FIG. 3, in an initial configuration state, an HNB management server (HNB Management Server, referred to as HMS for short in the following) configures the following information for an HNB:

HNB capability information, where the information indicates the number of U-RNTIs required by the HNB;

a U-RNTI estimation time parameter, which is a duration of a timer for the HNB to locally estimate the utilization of U-RNTI resources, where the parameter includes a supplement estimation timer duration and a reclaiming estimation timer duration;

a minimum U-RNTI estimation threshold, which may be the number of U-RNTIs or may be a percentage of used U-RNTIs; and a maximum U-RNTI estimation threshold, which may be the number of U-RNTIs or may be a percentage of used U-RNTIs.

Certainly, most of the foregoing information, including the U-RNTI estimation time parameter, the minimum U-RNTI estimation threshold, and the maximum U-RNTI estimation threshold, may also be configured by an HNB-GW for the HNB.

The HNB carries HNB capability information in an HNB register request message and reports the HNB register request message to the HNB-GW.

The HNB-GW carries usable U-RNTI resources, for example, a U-RNTI prefix segment, in an HNB register accept message according to HNB capability reported by the HNB.

In this embodiment, whether to supplement and whether to reclaim U-RNTI resources for the HNB are estimated in step 1 and step 4, respectively. The estimation in step 1 and step 4 may also be implemented in a same step. When an estimation result is supplementing the U-RNTI resources, step 2 and step 3 are performed, and when the estimation result is reclaiming the U-RNTI resources, step 5 and step 6 are performed.

Step 1: The HNB locally estimates the utilization of U-RNTI resources and decides whether to request supplementary allocation of U-RNTI resources.

If the time that the number or percentage of U-RNTIs used by the HNB exceeds the maximum U-RNTI estimation threshold reaches the supplement estimation timer duration, the HNB should request the HNB-GW to further allocate some U-RNTI resources.

An opportunity for the HNB to estimate the U-RNTI resources may be controlled by an estimation timer or may be triggered by an event, for example, an access request of a new UE.

Step 2: According to an estimation result in step 1, if it is required to request the HNB-GW to supplement U-RNTI allocation, the HNB sends a U-RNTI update request to the HNB-GW to request allocation of new U-RNTI resources, where the message carries a U-RNTI parameter required to be added, and the parameter may be the number of U-RNTIs or may be a percentage of the U-RNTIs.

For description of the U-RNTI update message, reference may be made to Table 1. In addition, the request may also be included in an existing HNBAP message. For example, information of a U-RNTI required to be supplemented is carried in a register request message of a user equipment.

Step 3: The HNB-GW sends a newly allocated U-RNTI prefix segment to the HNB through a U-RNTI update response.

For description of the U-RNTI update response, reference may be made to Table 2. The HNB-GW may also include the supplemented U-RNTI prefix segment in the existing HNBAP message. For example, information of a U-RNTI required to be supplemented is carried in a register accept message of a user equipment.

In an example, the HNB-GW may determine whether U-RNTI resources allocated in the range of the gateway is greater than a certain threshold, and can send added U-RNTI resource information to the HNB through the update response only if the allocated U-RNTI resources are not greater than the threshold.

Step 4: The HNB locally estimates the utilization of the U-RNTI resources and decides whether to reclaim a part of U-RNTI prefix segments.

If the time that the number or percentage of U-RNTIs used by the HNB does not exceed the minimum U-RNTI estimation threshold reaches the reclaiming estimation timer duration, the HNB-GW should reclaim a part of U-RNTIs.

An opportunity for the HNB to estimate the U-RNTI resources may be controlled by the estimation timer or may be triggered by an event, for example, an access request of a new UE or a release of a connection between a user equipment and an RRC.

Step 5: According to an estimation result in step 4, the HNB feeds back reclaimable U-RNTI prefix segments to the HNB-GW through a U-RNTI update request.

For description of the U-RNTI update request, reference may be made to Table 1. In addition, the request may also be included in the existing HNBAP message. For example, information of a U-RNTI required to be reclaimed is carried in a register request of a user equipment or a DE-REGISTER message of a user equipment.

Step 6: The HNB-GW feeds back a reclaiming result to the HNB through a U-RNTI update response. For description of the U-RNTI update response, reference may be made to Table 2. It should be noted that, the U-RNTI UPDATE RESPONSE is optional, and after modifying local U-RNTI resource allocation, the HNB-GW may not send a response message to the HNB.

The present disclosure may be implemented from the perspective of hardware and units in addition to software and processes. Specific description is given in the following with reference to Embodiments 4 and 5.

Embodiment 4

Figure 4:
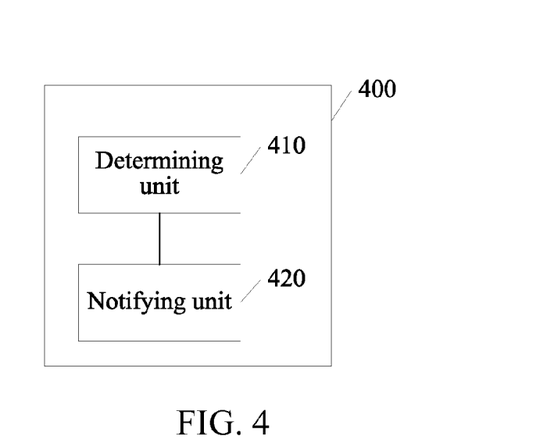
FIG. 4 is a schematic structural diagram of a micro cell gateway according to Embodiment 4 of the present disclosure.

FIG. 4 is a schematic structural diagram of a micro cell gateway according to Embodiment 4 of the present disclosure. As shown in FIG. 4, a micro cell gateway 400 includes a determining unit 410 and a notifying unit 420. The determining unit 410 determines, according to the utilization of radio network temporary identifier resources, to update radio network temporary identifier resources of a certain micro cell. The notifying unit 420 sends an update request for updating the radio network temporary identifier resources of the micro cell to the micro cell.

In some embodiments, the gateway includes a judgment unit, configured to judge the utilization of the radio network temporary identifier resources according to locally saved user information. In some embodiments, the user information is a user equipment context. The radio network temporary identifier resources are represented by an identifier segment, an index, or a prefix segment of the radio network temporary identifier resources.

In some embodiments, the gateway includes a receiving unit, configured to receive a register request message of the micro cell, where the register request message carries capability information of the micro cell; and an allocating unit, configured to allocate radio network temporary identifier resources to the micro cell according to the capability information of the micro cell and send the radio network temporary identifier resources to the micro cell through a register accept message, where the register accept message includes usable radio network temporary identifier resources, and the radio network temporary identifier resources are represented by an identifier segment, an index, or a prefix segment of the radio network temporary identifier resources.

In some embodiments, if allocatable radio network temporary identifier resources are less than a first threshold, the determining unit determines to add radio network temporary identifier resources of the micro cell to be updated. For example, if the number of unused radio network temporary identifiers is less than a certain threshold or a percentage of the number of unused radio network temporary identifiers in the total number of radio network temporary identifiers is lower than a certain threshold, the gateway needs to further allocate some radio network temporary identifier resources to the micro cell. In this case, the update means adding radio network temporary identifier resources, and the notifying unit sends information of added radio network temporary identifier resources to the micro cell through an update request.

In some embodiments, if used radio network temporary identifier resources are less than a second threshold, the determining unit determines to reclaim radio network temporary identifier resources of the micro cell to be updated. For example, if the number of radio network temporary identifiers used in the micro cell within a certain duration does not reach a certain threshold or the used radio network temporary identifiers do not reach a certain percentage, the gateway may initiate a process of reclaiming radio network temporary identifiers. In this case, the update means reducing radio network temporary identifier resources, and the notifying unit sends parameters of reduced radio network temporary identifier resources to the micro cell through an update request.

In some embodiments, the update request includes updating a parameter of the radio network temporary identifier resources, and the parameter of the radio network temporary identifier resources may include the number or a percentage of the radio network temporary identifier resources.

The implementation of the foregoing units is the same as Embodiment 1, and therefore no further details are provided herein.

Embodiment 5

Figure 5:
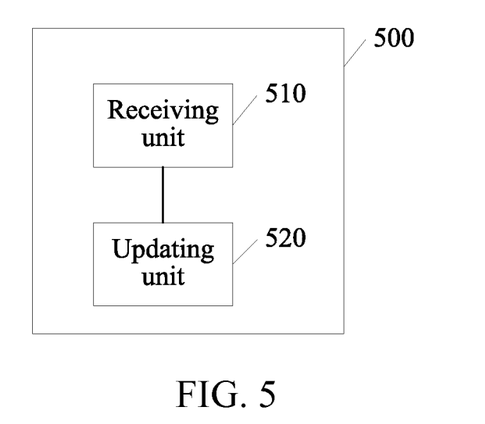
FIG. 5 is a schematic structural diagram of a micro cell according to Embodiment 5 of the present disclosure.

FIG. 5 is a schematic structural diagram of a micro cell according to Embodiment 5 of the present disclosure. In FIG. 5, a micro cell 500 includes a receiving unit 510, for receiving an update request for radio network temporary identifier resources from a gateway; and an updating unit 520, for updating the radio network temporary identifier resources of the micro cell according to the update request for the radio network temporary identifier resources.

In some embodiments, the updating unit adds the radio network temporary identifier resources of the micro cell or reclaims the radio network temporary identifier resources of the micro cell, where the radio network temporary identifier resources may be represented by an identifier segment, an index, or a prefix segment of the radio network temporary identifier resources.

The implementation of the foregoing units is the same as Embodiment 1, and therefore no further details are provided herein.

Embodiment 6

Figure 6:
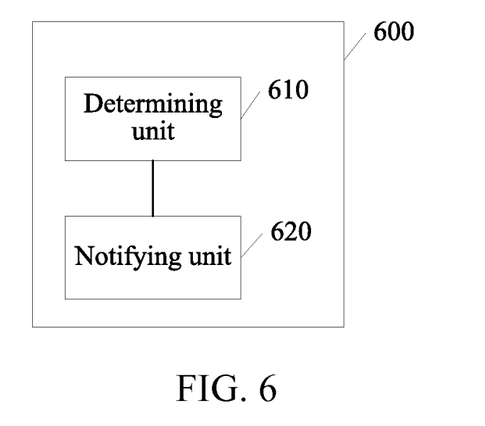
FIG. 6 is a schematic structural diagram of a micro cell according to Embodiment 6 of the present disclosure.

FIG. 6 is a schematic structural diagram of a micro cell according to Embodiment 6 of the present disclosure. In FIG. 6, a micro cell 600 includes a determining unit 610, for determining, according to the utilization of radio network temporary identifier resources of the micro cell, to update the radio network temporary identifier resources of the micro cell; and a notifying unit 620, for sending, when it is determined to update the radio network temporary identifier resources of the micro cell, an update request for updating the radio network temporary identifier resources of the micro cell to a gateway.

In some embodiments, the micro cell further includes: a sending unit, configured to send a register request message to the gateway, where the register request message carries capability information of the micro cell; and a receiving unit, configured to receive a register accept message fed back by the gateway according to the capability information of the micro cell, where the register accept message includes usable radio network temporary identifier resources, an estimation time parameter, a minimum estimation threshold, and a maximum estimation threshold, the radio network temporary identifier resources are represented by an identifier segment, an index, or a prefix segment of the radio network temporary identifier resources, and the estimation time parameter includes a supplement estimation timer duration and a reclaiming estimation timer duration.

In some embodiments, the micro cell further includes: a receiving unit, configured to receive configuration information sent by a micro cell management server, where the configuration information includes usable radio network temporary identifier resources, an estimation time parameter, a minimum estimation threshold, and a maximum estimation threshold, the radio network temporary identifier resources are represented by an identifier segment, an index, or a prefix segment of the radio network temporary identifier resources, and the estimation time parameter includes a supplement estimation timer duration and a reclaiming estimation timer duration.

When the micro cell locally estimates the utilization of radio network temporary identifier resources, and if the time that the radio network temporary identifier resources exceed the maximum estimation threshold reaches the supplement estimation timer duration, the determining unit determines to add radio network temporary identifier resources of the micro cell. For example, if the time that the number or percentage of radio network temporary identifiers used by the micro cell exceeds the maximum radio network temporary identifier estimation threshold reaches the supplement estimation timer duration, the micro cell should request the gateway to further allocate some radio network temporary identifier resources. In this case, the update means adding radio network temporary identifier resources, and the notifying unit sends parameters of added radio network temporary identifier resources to the gateway. The micro cell includes a receiving unit for receiving the supplemented radio network temporary identifier resources from the gateway.

When the micro cell locally estimates the utilization of radio network temporary identifier resources, and if the time that the radio network temporary identifier resources are less than the minimum estimation threshold reaches the reclaiming estimation timer duration, the determining unit determines to reclaim radio network temporary identifier resources of the micro cell. If the time that the number or percentage of radio network temporary identifiers used by the micro cell does not exceed (that is, less than) the minimum estimation threshold reaches the reclaiming estimation timer duration, the gateway should reclaim a part of radio network temporary identifier resources. In this case, the update means reducing radio network temporary identifier resources, and the notifying unit sends information of reduced radio network temporary identifier resources to the gateway.

In some embodiments, the notifying unit sends an update request carrying a parameter of the radio network temporary identifier resources to the gateway, where the parameter of the radio network temporary identifier resources includes the number or percentage of the radio network temporary identifier resources.

In some embodiments, the micro cell further includes a receiving unit, where if the parameter of the radio network temporary identifier resources that is carried in the update request is adding the number or percentage of the radio network temporary identifier resources, the receiving unit receives an update response of the radio network temporary identifier resources that is sent by the gateway.

The implementation of each unit in Embodiment 6 is the same as Embodiments 2 and 3, and therefore no further details are provided.

The embodiments of the present disclosure solve the problem that U-RNTI resources in a certain HNB are wasted or insufficient after an HNB-GW allocates U-RNTI resources to HNBs. The HNB-GW may dynamically reclaim or add U-RNTI resources of a certain HNB according to a network load condition.

Persons skilled in the art should further realize that units and algorithm steps of each example described through the embodiments disclosed herein can be implemented with electronic hardware, computer software, or a combination thereof. In order to clearly describe the interchangeability between the hardware and the software, compositions and steps of each example have been generally described according to functions in the foregoing descriptions. Whether these functions are executed as hardware or software depends upon the particular application and design constraint conditions of the technical solution. Persons skilled in the art can use different methods to implement the described functions for each particular application, but it should not be considered that the implementation goes beyond the scope of the present disclosure.

The above descriptions are merely preferred embodiments of the present disclosure, but not intended to limit the present disclosure. Any modification and equivalent replacement made without departing from the spirit and principle of the present disclosure shall fall within the protection scope of the present disclosure.

What is claimed is:

1. A method for allocating a radio network temporary identifier, the method comprising:
   determining, by a micro cell and according to a utilization of radio network temporary identifier resources of the micro cell and a first estimation threshold, to update radio network temporary identifier resources of the micro cell;
   sending, by the micro cell, an update request for the radio network temporary identifier resources to a gateway;
   sending, by the micro cell, a register request message to the gateway, wherein the register request message carries capability information of the micro cell; and
   receiving, by the micro cell, a register accept message fed back by the gateway according to the capability information of the micro cell, wherein the register accept message comprises usable radio network temporary identifier resources, an estimation time parameter, a minimum estimation threshold, and a maximum estimation threshold, wherein the radio network temporary identifier resources are represented by an identifier segment, an index, or a prefix segment of the radio network temporary identifier resources, and wherein the estimation time parameter comprises a supplement estimation timer duration and a reclaiming estimation timer duration:
   wherein determining to update the radio network temporary identifier resources of the micro cell comprises:
      in response to determining that the time that the radio network temporary identifier resources exceed the maximum estimation threshold reaches the supplement estimation timer duration, determining to add radio network temporary identifier resources of the micro cell; or
      in response to determining that the time that the radio network temporary identifier resources are less than the minimum estimation threshold reaches the reclaiming estimation timer duration, determining to reclaim radio network temporary identifier resources of the micro cell.

2. The method according to claim 1, wherein sending the update request for the radio network temporary identifier resources to the gateway comprises sending, by the micro cell, the update request carrying a parameter of the radio network temporary identifier resources to the gateway, wherein the parameter of the radio network temporary identifier resources comprises a number or a percentage of the radio network temporary identifier resources.

3. The method according to claim 2, wherein if the parameter of the radio network temporary identifier resources that is carried in the update request is adding the number or the percentage of the radio network temporary identifier resources, receiving, by the micro cell, an update response of the radio network temporary identifier resources that is sent by the gateway.

4. A home base station, comprising:
   a processor; and
   a computer-readable storage medium storing a program to be executed by the processor, the program including instructions for:
      determining, according to a utilization of radio network temporary identifier resources of a micro cell and a first estimation threshold, to update radio network temporary identifier resources of the micro cell; and
   a transmitter, configured to send an update request for updating the radio network temporary identifier resources to a gateway;
   wherein the transmitter is further configured to send a register request message to the gateway, wherein the register request message carries capability information of the micro cell;

wherein the home base station further comprises a receiver, configured to receive a register accept message fed back by the gateway according to the capability information of the micro cell, wherein the register accept message comprises usable radio network temporary identifier resources, an estimation time parameter, a minimum estimation threshold, and a maximum estimation threshold, wherein the radio network temporary identifier resources are represented by an identifier segment, an index, or a prefix segment of the radio network temporary identifier resources, and wherein the estimation time parameter comprises a supplement estimation timer duration and a reclaiming estimation timer duration;

wherein determining to update radio network temporary identifier resources of the micro cell comprises:

in response to a time that the radio network temporary identifier resources exceed the maximum estimation threshold reaching the supplement estimation timer duration, determining to add radio network temporary identifier resources of the micro cell; or in response to a time that the radio network temporary identifier resources are less than the minimum estimation threshold reaching the reclaiming estimation timer duration, determining to reclaim radio network temporary identifier resources of the micro cell.

5. The home base station according to claim 4, wherein the transmitter sends the update request carrying a parameter of the radio network temporary identifier resources to the gateway, wherein the parameter of the radio network temporary identifier resources comprises a number or a percentage of the radio network temporary identifier resources.

6. The home base station according to claim 5, further comprising a receiver, wherein if the parameter of the radio network temporary identifier resources that is carried in the update request is adding the number or percentage of the radio network temporary identifier resources, the receiver receives an update response of the radio network temporary identifier resources that is sent by the gateway.

* * * * *